US006420012B1

(12) United States Patent
Takagi et al.

(10) Patent No.: US 6,420,012 B1
(45) Date of Patent: Jul. 16, 2002

(54) TONER CARRIER AND IMAGE-FORMING APPARATUS

(75) Inventors: Koji Takagi, Kawasaki; Toshiaki Arai, Kodaira; Takao Ohuchi, Hamura; Tokuo Okada, Kodaira, all of (JP)

(73) Assignee: Bridgestone Corporation, Tokyo (JP)

( * ) Notice: Subject to any disclaimer, the term of this patent is extended or adjusted under 35 U.S.C. 154(b) by 186 days.

(21) Appl. No.: 09/620,997

(22) Filed: Jul. 20, 2000

(30) Foreign Application Priority Data

Jul. 21, 1999 (JP) .......................................... 11-205682
Jan. 20, 2000 (JP) ...................................... 2000-011650

(51) Int. Cl.[7] ............................. B32B 9/00; G03G 9/00

(52) U.S. Cl. ......................... 428/141; 399/31; 428/335; 428/409; 428/492; 430/105; 430/111; 430/455

(58) Field of Search ................................ 428/335, 141, 428/409, 492; 430/105, 111, 455; 399/31

(56) References Cited

U.S. PATENT DOCUMENTS

| | | | | |
|---|---|---|---|---|
| 3,152,012 A | | 10/1964 | Schaffert | |
| 3,731,146 A | | 5/1973 | Bettiga et al. | |
| 4,910,559 A | * | 3/1990 | Kuge et al. | 355/285 |
| 5,384,224 A | * | 1/1995 | Tanikawa et al. | 430/16 |
| 5,968,701 A | * | 10/1999 | Onuma et al. | 430/110 |
| 6,187,501 B1 | * | 2/2001 | Aylward et al. | 430/201 |
| 6,333,131 B1 | * | 12/2001 | Ishiyama et al. | 430/108.6 |

* cited by examiner

*Primary Examiner*—Hoa T. Le
(74) *Attorney, Agent, or Firm*—Sughrue Mion, PLLC

(57) ABSTRACT

A toner carrier which carries a toner in the form of thin film on its surface, comes close to or comes into contact with the image-forming body so as to supply the toner to the surface of the image-forming body, thereby forming a visible image on the surface of the image-forming body, said toner carrier being characterized in that its conductive elastic layer has a coating layer thereon which is made of a material containing a resin with a glass transition point lower than 10° C. and has a dynamic elastic modulus (E') of $10^7$–$10^{9.8}$ dyn/cm$^2$ and a loss tangent (tan δ) smaller than 0.7. A toner carrier in which the electrically conductive elastic layer is formed from an elastic material having a tear strength greater than 10 kg/cm measured according to JIS K6252.

16 Claims, 1 Drawing Sheet

TONER CARRIER AND IMAGE-FORMING APPARATUS

BACKGROUND OF THE INVENTION

1. Field of the Invention

The present invention relates to a toner carrier and an image-forming apparatus. More particularly, the present invention relates to a toner carrier which is used for image-forming apparatus, such as copying machines, facsimiles, and printers, in such a way that a toner is supplied to an image-forming medium, such as photo-sensitive material and paper having an electrostatic latent image, thereby forming a visible image on the surface of the image forming medium. The toner carrier forms uniform, high-quality images and has good durability with a minimum change in its characteristic properties after prolonged use. The present invention relates also to an image-forming apparatus which employs the toner carrier.

2. Description of the Related Art

In conventional image-forming apparatus of electrophotography system, such as copying machines and printers, the image-forming medium, such as photosensitive material, having an electrostatic latent image is supplied with a one-component toner and the toner is caused to adhere to the latent image so that the latent image is made visible (or an image is formed). This process is known as the pressure development. (See U.S. Pat. Nos. 3,152,012 and 3,731,146.)

In the process for pressure development, a toner carrier carrying a toner is brought into contact with the image-forming medium (photosensitive material) having an electrostatic latent image such that the toner adheres to the latent image on the image-forming medium to form a visible image. Consequently, the toner carrier has to be formed from a conductive elastic material having both electrical conductivity and elasticity.

As shown in FIG. 2, the process for pressure development employs a toner carrier (or development roller) 1 arranged between a toner supply roller 5 and an image-forming roller (photosensitive body) 6 which carries an electrostatic latent image. As the toner carrier 1, the image-forming body 6, and the toner supply roller 5 rotate respectively in the direction of arrows shown in the figure, the toner 7 is supplied to the surface of the toner carrier 1 by the toner coating roller 5. The thus supplied toner is made into a uniform thin film by the spreading blade 8. As the toner carrier 1 carrying a thin toner film thereon rotates in contact with the image-forming body 6, the toner (in the form of thin film) transfers from the toner carrier 1 to the latent image on the image-forming body 6, with the result that the latent image is made visible. The visible image is finally transferred to the recording medium (such as paper) by the transfer unit 9. After transfer, the residual toner remaining on the surface of the image-forming body 6 is removed by the cleaning blade 11 of the cleaning unit 10.

The image-forming apparatus for pressure development requires that the toner carrier 1 should rotate in close contact with the image-forming body 6. Therefore, the toner carrier 1 is constructed as shown in FIG. 1. The shaft 2 is made of metal having good electrical conductivity. On the shaft is formed the electrically conductive elastic layer 3 which is composed of elastic rubber or foam (such as silicone rubber, acrylonitrile butadiene rubber, ethylene-propylene rubber, and polyurethane rubber) and an electrically-conductive material. The electrically conductive elastic layer 3 is covered with the coating layer 4 of resin or the like which permits the toner 7 to be charged adequately and to become sticky adequately and also controls friction with the image-forming body 6 and the spreading blade 8. The coating layer 4 also prevents the image-forming body from being stained by the elastic body.

There is another image-forming method. According to this method, the toner carried by the toner carrier is caused to fly directly to the image-forming body (such as paper and transparency sheet) through a perforated control electrode. There is further another image-forming method. According to this method, a toner carrier in sleeve form is arranged in close proximity (but not in contact) of the image-forming body (or photosensitive body) and a non-magnetic toner is spread in thin film over the surface of the toner carrier. The toner flies to the image-forming body to form an image. (See Japanese Patent Laid-open No. 116559/1983.)

The above-mentioned toner carrier usually has its electrically conductive elastic layer covered with a coating layer of resin or the like which controls the chargeability and stickiness of the toner and reduces friction with the image-forming body, spreading blade, and control electrode. This coating layer is formed from melamine resin, phenolic resin, alkyd resin, fluorocarbon resin, polyamide resin, or the like.

SUMMARY OF THE INVENTION

The recent technical advance, including faster printers, finer images, and color images, needs to meet more stringent requirements than before. When the conventional toner carrier is used (in a printer, for example) for a long period of time, the following problems arise. (1) Fogging occurs in a white image and density becomes insufficient in a black solid image. (2) Image noise occurs cyclically as the toner carrier rotates. (3) Streaky image (defect) occurs at the part corresponding to the edge of the toner carrier.

The present invention has been completed in view of the foregoing. It is an object of the present invention to provide a toner carrier which exhibits good durability for a long period of time while continuously producing high-quality images. It is another object of the present invention to provide an image forming apparatus equipped with the toner carrier.

In order to achieve the above-mentioned object, the present inventors carried out extensive studies to find the following. The problem (1) mentioned above arises when a large amount of toner forms a film on the surface of the toner carrier after prolonged operation, with the ratio of insufficiently charged toner increasing. The problem (2) mentioned above arises when cracking or peeling occurs in the coating layer on the surface of the toner carrier after prolonged operation. The problem (3) mentioned above arises when the edge of the toner carrier wears due to friction with the toner which accumulates and remains on the edge of the toner carrier without being used for development.

It was found that the problems (1) and (2) can be solved if the toner carrier is provided with an adequate coating layer. It was also found that the problem (3) can be solved if the toner carrier is provided with an adequate conductive elastic layer. These findings led to the present invention.

The first aspect of the present invention resides in a toner carrier composed of an electrically conductive shaft and an electrically conductive elastic layer formed around said shaft, said toner carrier carrying a toner in the form of thin film on its surface, coming close to or coming into contact with the image-forming body so as to supply the toner to the surface of the image-forming body, thereby forming a visible image on the surface of the image-forming body, characterized in that said electrically conductive elastic layer has a coating layer thereon which is made of a material containing a resin with a glass transition point lower than 10° C. and has a dynamic elastic modulus (E') of $10^7$–$10^{9.8}$ dyn/cm$^2$ and a loss tangent (tan δ) smaller than 0.7.

The second aspect of the present invention resides in an image-forming apparatus equipped with a toner carrier which carries a toner in the form of thin film on its surface, comes close to or comes into contact with the image-forming body so as to supply the toner to the surface of the image-forming body, thereby forming a visible image on the surface of the image-forming body, wherein the toner carrier is one which is defined as above.

The third aspect of the present invention resides in a toner carrier composed of an electrically conductive shaft and an electrically conductive elastic layer formed around the shaft, the toner carrier carrying a toner in the form of thin film on its surface, coming close to or coming into contact with the image-forming body so as to supply the toner to the surface of the image-forming body, thereby forming a visible image on the surface of the image-forming body, characterized in that the electrically conductive elastic layer is made of an elastic material having a tear strength greater than 10 kg/cm (according to JIS K6252).

The fourth aspect of the present invention resides in an image-forming apparatus equipped with the toner carrier as defined above (in the third aspect of the invention).

DESCRIPTION OF THE PREFERRED EMBODIMENTS

Figure 1:
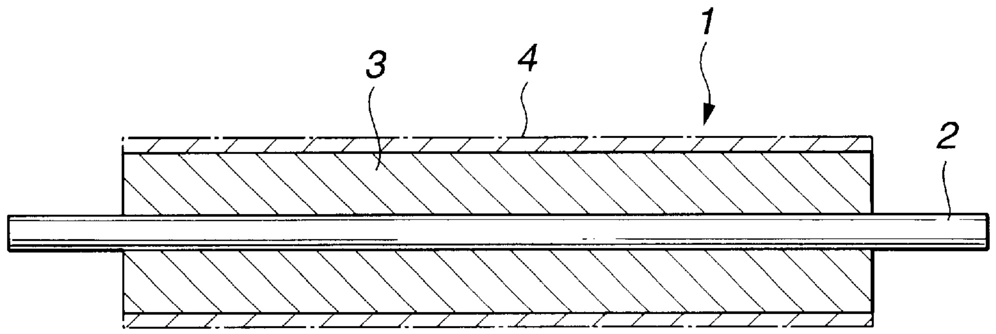
FIG. 1 is a schematic diagram showing one example of the toner carrier according to the present invention.

The toner carrier according to the first aspect of the present invention is shown in FIG. 1. It is composed of an electrically conductive shaft 2, an electrically conductive elastic layer 3 surrounding the shaft 2, and a coating layer 4 covering the surface of the electrically conductive layer 3. The shaft 2 may be made of any material having good electrical conductivity. It is usually a solid or hollow cylindrical metal shaft.

The electrically conductive elastic layer 3 is made of an elastic material (or rubbery material) incorporated with an electrically conducting material. The rubbery material is not specifically restricted. It includes, for example, nitrile rubber, ethylene propylene rubber, ethylene propylene diene rubber, styrene butadiene rubber, butadiene rubber, isoprene rubber, natural rubber, silicone rubber, urethane rubber, acryl rubber, chloroprene rubber, butyl rubber, and epichlorohydrin rubber. They may be used alone or in combination with one another. Preferable among them are one or more species in combination selected from butadiene rubber, ethylene propylene rubber, and urethane rubber.

The electrically conducting material to be incorporated into these rubbery materials is divided into ionic ones and electronic ones. The former includes, for example, tetraethyl ammonium, tetrabutyl ammonium, lauryl trimethyl ammonium (or dodecyl trimethyl ammonium), hexadecyl trimethyl ammonium, stearyl trimethyl ammonium (or octadecyl trimethyl ammonium), benzyl trimethyl ammonium, modified aliphatic dimethyl ethyl ammonium, and other ammonium salts of perchloric acid, chloric acid, hydrochloric acid, bromic acid, iodic acid, hydroborofluoric acid, sulfuric acid, alkylsulfuric acid, carboxylic acid, and sulfonic acid. Other examples include alkali metal (e.g., lithium and sodium) salts and alkaline earth metal (e.g., calcium and magnesium) salts of perchloric acid, chloric acid, hydrochloric acid, bromic acid, iodic acid, hydroborofluoric acid, trifluoromethyl sulfuric acid, and sulfonic acid.

Examples of electronic electrically conducting materials include electrically conductive carbon black (such as Ketjen black and acetylene black), rubber carbon black (such as SAF, ISAF, HAF, FEF, GPF, SRF, FT, and MT), acid-treated ink carbon black, pyrolytic carbon black, graphite, electrically conductive metal oxides (such as tin oxide, titanium oxide, and zinc oxide), and metal powder (such as nickel powder and copper powder).

These electrically conducting materials may be used alone or in combination with one another. The amount of loading is not specifically restricted. Loadings for ionic conducting materials may be 0.01–5 parts by weight, preferably 0.05–2 parts by weight, for 100 parts by weight of the rubbery material. Loadings for electronic conducting materials may be 1–50 parts by weight, preferably 5–40 parts by weight, for 100 parts by weight of the rubbery material.

The amount of the conducting material should be adjusted so that the electrically conductive elastic layer has a resistivity of $10^3$–$10^{10}$ Ω·cm, particularly $10^4$–$10^8$ Ω·cm. Incidentally, the electrical may be incorporated with well-known rubber additives (such as fillers and cross-linking agents) in addition to the above-mentioned conducting material, according to need.

The electrically conductive elastic layer should have a hardness of 40–80, particularly 50–75, as measured by "ASKER" hardness meter, type C. With a hardness greater than 80, the toner carrier becomes hard and has a small area of contact with the image-forming body. Therefore, it does not form good images; in addition, it damages the toner, causing the toner to stick to the image-forming body and the spreading blade, thereby forming poor images. With an excessively low hardness, the toner carrier has high friction with the image-forming body and the spread blade, resulting in poor images due to jittering.

The electrically conductive elastic layer should preferably have a low compression set because it is used in contact with the image-forming body and the spread blade. To be specific, the value of compression set should be lower than 20%, particularly lower than 10%. This requirement is met easily in the case of polyurethane rubber.

In addition, the electrically conductive elastic layer should preferably have a surface roughness smaller than 15 μm Rz, particularly 3–10 μm Rz in terms of 10-point average roughness according to JIS. If this average surface roughness exceeds 15 μm Rz, it is necessary that the coating layer covering the surface of the toner carrier should be formed thick. The toner carrier with a thick coating layer has a hard surface which damages the toner and causes the toner to stick to the image-forming body and spread blade, giving rise to poor images. If the average surface roughness is too small, the surface of the toner carrier is too smooth when the coating layer is formed, and the toner carrier carries only an insufficient amount of toner and hence gives rise to images with a low image density.

Incidentally, the above-mentioned value of surface roughness was measured with a surface roughness meter "Surfcom 590A" (from Tokyo Seimitsu) under the following conditions.

Length of measurement: 2.4 mm in circumferential direction.

Speed of measurement: 0.3 mm/sec.

Cut-off wavelength: 0.8 mm

Number of points of measurement: more than 300, evenly in both the lengthwise and circumferential directions. (This applies to the following.)

As shown in FIG. 1, the toner carrier pertaining to the first aspect of the present invention is constructed such that the above-mentioned electrically conductive elastic layer 3 is covered with a resin coating layer 4 which reduces friction with the image-forming body and the spread blade and prevents the image-forming body from being stained by the elastic body. This coating layer 4 should be made of a resin material having the following characteristic properties.

Glass transition point: lower than 10° C., preferably from −50° C. to 0° C.

Dynamic elastic modulus (E'): $10^7$–$10^{9.8}$ dyn/cm$^2$, preferably $10^8$–$10^{9.6}$ dyn/cm$^2$.

Loss tangent (tan δ): smaller than 0.7, preferably from 0.05 to 0.5. (Loss tangent is defined as the ratio of dynamic loss E" to dynamic elastic modulus E' which the sample encounters when it receives stress.)

If the resin material has a glass transition point higher than 10° C. or lower than 40° C., the resulting coating layer greatly varies in physical properties depending on the temperature at which it is used. This leads to variation in the amount of toner carried and the amount of charge. If the resin material has a glass transition point higher than 40° C., the resulting coating layer is so brittle as to follow the deformation of the electrically conductive elastic layer. Thus the coating layer is liable to cracking and hence it is impossible to achieve the object of the present invention.

If the coating layer has a dynamic elastic modulus E' outside the values specified above ($10^7$–$10^{9.8}$ dyn/cm$^2$) or has a loss tangent (tan δ) exceeding 0.7, then such troubles as toner filming and coating layer cracking occurs at the time of printing. In addition, after prolonged use of the toner carrier, fogging occurs in a white image, density shortage occurs in a black solid image, and image noises occur.

The resin material used to form the coating layer includes crosslinkable resins. By crosslinkable resins are meant those resins which undergo self-crosslinking by heat, catalyst, air (oxygen), or moisture (water), or those resins which undergo crosslinking with a crosslinking agent or any other crosslinkable resin.

Such crosslinkable resins are exemplified by fluorocarbon resin, polyamide resin, acrylurethane resin, alkyd resin, phenolic resin, melamine resin, silicone resin, urethane resin, polyester resin, polyvinylacetal resin, epoxy resin, polyether resin, amino resin, urea resin, acrylic resin, acryl-modified silicone resin, and styrene-butadiene resin, and a mixture thereof, having such reactive groups as hydroxyl group, carboxyl group, acid anhydride group, amino group, imino group, isocyanate group, methylol group, alkoxymethyl group, aldehyde group, mercapto group, epoxy group, unsaturated group, or the like.

Preferable among them are fluorocarbon resin, polyamide resin, acrylurethane resin, alkyd resin, phenolic resin, melamine resin, silicone resin, urethane resin, polyester resin, polyvinylacetal resin, epoxy resin, acrylic resin, acryl-modified silicone resin, and styrene-butadiene resin, and a mixture thereof. Particularly preferable among them are alkyd resin, phenolic resin, melamine resin, polyester resin, acrylic resin, acryl-modified silicone resin, and styrene-butadiene resin, and a mixture thereof. They permit the toner to be charged adequately, they do not stain the toner, they reduce friction with other members, and they do not stain the image-forming body.

The above-mentioned catalyst includes radical catalysts (such as peroxides and azo compounds), acid catalysts, and basic catalysts. The above-mentioned crosslinking agent includes those compounds which have a molecular weight smaller than 1000, preferably smaller than 500, and has two or more reactive groups in one molecule, such as hydroxyl group, carboxyl group, acid anhydride group, amino group, imino group, isocyanate group, methylol group, alkoxymethyl group, aldehyde group, mercapto group, epoxy group, and unsaturated group. Specific examples include polyol compounds, polyisocyanate compounds, polyaldehyde compounds, polyamine compounds, and polyepoxy compounds.

The coating layer pertaining to the present invention should contain more than 70 wt %, preferably more than 80 wt %, of insoluble matter in solvent. If the content of insoluble matter is less than 70 wt %, the coating layer is liable to depression due to prolonged contact with the image-forming body and spread blade. Such depression would give black horizontal lines to the image.

The coating layer pertaining to the present invention is composed mainly of the above-mentioned crosslinkable resin. It may contain such additives as charge-controlling agent, slip agent, and conducting material so as to improve the charging performance of the toner, to reduce friction with any other members, and to impart electrical conductivity.

The toner carrier of the present invention should have an adequate resistance. This object is achieved if the coating layer has a resistance greater than that of the electrically conductive elastic layer. The coating layer should preferably have a resistivity of $10^7$–$10^{16}$ Ω·cm. particularly $10^9$–$10^{14}$ Ω·cm. The toner carrier should preferably have a resistivity of $10^3$–$10^{12}$ Ω·cm, particularly $10^4$–$10^8$ Ω·cm. The resistivity of the coating layer is measured in the following manner. A piece of copper plate is coated with the same coating solution as that used for the coating layer of the toner carrier. The coated film is subsequently heated for crosslinking in the same way as the toner carrier is heated. With an electrode placed on the coated film, resistance between the electrode and the copper plate is measured. The thus measured resistance is regarded as the resistivity. The resistance of the toner carrier is measured with an ohmmeter (R8340A from Advantest Co., Ltd.) at 100 V, in such a way that the toner carrier is pressed against a copper plate by a 500-g load attached to each end of the toner carrier.

The coating layer formed on the toner carrier should preferably has a surface roughness smaller than 10 μm Rz, particularly 0.3–8 μm Rz (in terms of 10-point average roughness according to JIS). With an average surface roughness exceeding 10 μm Rz, the coating layer causes the toner to be charged only insufficiently or charged oppositely, resulting in fogging in the image. With an excessively small average surface roughness, the coating layer carries only a small amount of toner, resulting in an image with a low density.

There are no specific restrictions on the method of forming the coating layer on the electrically conductive elastic layer. Desirable methods are dipping, roll coating, knife coating, and spraying, followed by drying and crosslinking (hardening) at normal temperature or 50–170° C. The coating solution may be prepared from a crosslinkable resin, a crosslinking agent, a solvent, and optional additives.

The solvent for the coating solution includes, for example, alcohols (such as methanol, ethanol, isopropanol, and butanol), ketones (such as acetone, methyl ethyl ketone, and cyclohexane), aromatic hydrocarbons (toluene and xylene), aliphatic hydrocarbon (such as hexane), alicyclic hydrocarbon (such as cyclohexane), esters (such as ethyl acetate), ethers (such as isopropyl ether and tetrahydrofuran), amides (such as dimethylformamide), halogenated hydrocarbons (such as chloroform and dichloroethane), and mixtures thereof. In the present invention, it is desirable to use a ketone solvent or a mixed solvent of ketone and aromatic hydrocarbon.

The coating layer has a thickness of 1–50 μm, preferably 2–30 μm. If the coating layer is too thin, it causes localized discharge, thereby white horizontal lines likely to appear. On the other hand, if the coating layer is too thick, it damages the toner, causing the toner to stick to the image-forming body and the spreading blade, thereby forming poor images.

The toner carrier as defined by the third aspect of the present invention will be described in the following. This toner carrier is similar in construction to that defined by the first aspect of the present invention. As shown in FIG. 1, the toner carrier 1 is composed of an electrically conductive shaft 2 and an electrically conductive elastic layer 3 formed around the shaft. According to the present invention, the elastic layer 3 is formed from a specific elastomer having a tear strength greater than 10 kg/cm.

The electrically conductive shaft 2 may be a metal shaft as in the first aspect of the present invention. The electrically conductive elastic layer 3 may be formed from an electrically conductive elastomer (incorporated with an adequate conducting agent) as in the first aspect of the present invention. The elastomer may be in the form of foam which is chemically blown with a foaming agent or mechanically blown with air as in the case of polyurethane foam.

The electrically conductive elastic layer 3 may be formed from the same elastomer and conducting agent as shown in the first aspect of the present invention. Their formulation and the resistance adjusted by the conducting agent are also the same as those shown in the first aspect of the present invention.

The elastomer for the electrically conductive elastic layer 3 may be incorporated with a crosslinking agent and a vulcanizing agent to change the elastomer into a rubbery substance. Crosslinking may be accomplished by an organic peroxide or sulfur. In either cases, it is possible to use a vulcanization auxiliary, vulcanization accelerator, a vulcanization acceleration auxiliary, vulcanization retarder, etc. It is also possible to incorporate other additives such as peptizer, foaming agent, plasticizer, softening agent, tackifier, anti-tack agent, separator, mold release, extender, and colorant.

The elastomer from which the conductive elastic layer 3 is formed may be incorporated with additives to control the amount of charge of the toner carried on its surface. These additives include nigrosine, triaminophenylmethane, cation dyes, silicone resin, silicone rubber, nylon, etc.

The toner carrier defined by the third aspect of the present invention is characterized in that the elastomer forming the electrically conductive elastic layer 3 has a tear strength greater than 10 kg/cm, particularly greater than 12 kg/cm. The tear strength may be adequately controlled by selecting the base material of the elastomer, the conducting material and additives, and the vulcanizing condition. Incidentally, the tear strength is measured according to JIS K6252.

The electrically conductive elastic layer 3 is formed from an elastomer having a specific value of tear strength as mentioned above. This elastomer should preferably have abrasion resistance such that the amount of abrasion measured by the Lambourn abrasion tester (according to JIS K6264) is smaller than 0.1 $cm^3$, particularly smaller than 0.05 $cm^3$, more particularly smaller than 0.03 $cm^3$. The abrasion resistance is achieved if the elastomer has the tear strength as specified above. Incidentally, the Lambourn abrasion test may be carried out under any adequate conditions according to JIS K6264. The test condition, such as slipping ratio, may be adequately changed according to the sample used. Specific test conditions are as follows. grindstone: #40 sandpaper, slipping ratio: 99%, load: 4.5 kg, sample circumferential speed: 30 cm/sec, and testing time: 15 seconds.

The elastic layer 3 is not specifically restricted in hardness; however, it should preferably have a hardness (ASKER C) lower than 90, particularly 60–85. With a hardness exceeding 90, the elastic layer 3 has a small area of contact with the photosensitive drum, which prevents satisfactory development and damages the toner. (The damaged toner sticks to the photosensitive body and the spread blade, resulting in poor images.) Conversely, with an excessively low hardness, the elastic layer has a large amount of friction with the photosensitive body and the spread blade, resulting in poor images with jittering. The elastic layer 3 should preferably have as low a compression set as possible even though it has a low hardness, because it is used in contact with the photosensitive body and the spread blade. To be specific, the compression set should be lower than 20%.

The toner carrier according to the third aspect of the present invention may be used as the development roller, with the electrically conductive elastic layer 3 serving as the outermost layer. However, the electrically conductive elastic layer 3 may be covered with a resin coating layer as shown in FIG. 1. This resin coating layer adjusts resistance and controls the amount of charge on the toner and the amount of the toner to be carried. The resin from which the resin coating layer 4 is formed is not specifically restricted. It may be any resin which does not stain and stick to the photosensitive drum which supports latent images. Typical examples of the resin include polyester resin, polyether resin, fluorocarbon resin, epoxy resin, amino resin, polyamide resin, acrylic resin, arylurethane resin, urethane resin, alkyd resin, phenolic resin, melamine resin, urea resin, silicone resin, and polyvinyl butyral resin. They may be used alone or in combination with one another. In addition, they may be modified with specific functional groups.

The toner carrier pertaining to the third aspect of the present invention may be covered with the same coating layer as used for the toner carrier pertaining to the first aspect of the present invention, although this is not essential. The resulting toner carrier will exhibit better performance. Incidentally, the resin coating layer 4 may be the same in resistance, surface roughness, thickness, and forming method as that used for the toner carrier pertaining to the first aspect of the present invention.

Figure 2:
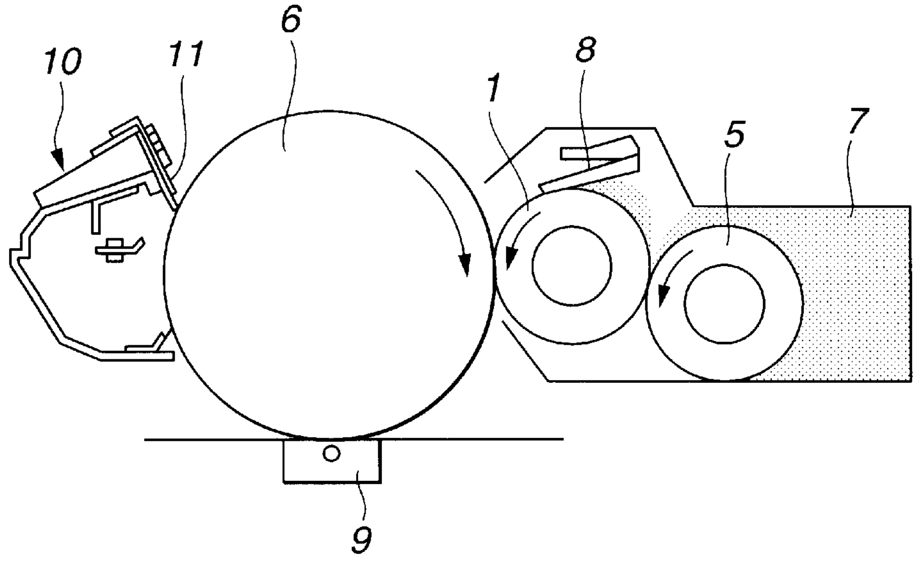
FIG. 2 is a schematic diagram showing one example of the image-forming apparatus according to the present invention.

The above-mentioned toner carrier pertaining to the first or third aspect of the present invention is used as the development roller in the image-forming apparatus for electrophotography. For example, the toner carrier of the present invention, which functions as the development roller 1, is arranged between the toner supply roller 5 to supply the toner and the photosensitive drum (image-forming body) 6 holding an electrostatic latent image, as shown in FIG. 2. The toner supply roller 5 carries the toner 7, and the toner 7 is spread into a uniform thin film by the spread blade 8. The thin film of the toner is transferred to the photosensitive drum (image-forming body) 6, so that the electrostatic latent image on the photosensitive drum (image-forming body) 6 is made visible. The detailed description of the image-forming apparatus shown in FIG. 2 has been given in the section of the prior art technology; therefore, it is not repeated here.

The image-forming apparatus equipped with the toner carrier of the present invention is not limited to the one shown in FIG. 2. It includes any one which is designed such that the toner carrier carries the toner in the form of thin film on its surface and comes close to or come into contact with the image-forming body to supply the toner to the surface of the image-forming body, thereby producing a visible image on the surface of the image-forming body. The image-forming body may be paper or transparency sheet. In this case, the toner being carried by the toner carrier is caused to fly through holes made in a control electrode, so that an image is formed directly on the paper or OHP sheet.

The toner carrier of the present invention is suitable for non-magnetic one-component toners; however, it is also used for magnetic one-component toners. For example, it is used for magnetic one-component toners for monochromatic printing.

The toner carrier pertaining to the first aspect of the present invention is durable for prolonged use without toner filming and cracking in the coating layer. The toner carrier pertaining to the third aspect of the present invention has improved abrasion resistance without the necessity of greatly increasing the surface hardness of the roller. It is free from abrasion that occurs at the roller ends due to friction with the toner, and hence it ensures good images for a long period of time.

EXAMPLES

The invention will be described in more detail with reference to the following examples, which are not intended to restrict the scope thereof.

The toner carriers obtained in Examples 1 to 6 and Comparative Examples 1 to 4 were tested in the following manner.

(1) Thickness of the Coating Layer

The sample roller was cut vertically and the cut surface was observed by a scanning electron microscope.

(2) Ratio of Solvent Insolubles of the Coating Layer

A glass plate was coated with the same coating solution as used to form the coating layer of the toner carrier. The film of the coating solution was heated for crosslinking and curing under the same condition as that in which the toner carrier was produced. The cured coating film together with the glass plate was immersed in methyl ethyl ketone for 24 hours at normal temperature and then dried. The weight of the coating film was measured before and after immersion, and the ratio of solvent insolubles was calculated according to the formula below. It was confirmed that the coating layer has a ratio of solvent insolubles equal to or greater than 70 wt %.

Ratio of solvent insolubles=[(Weight of coating film after immersion in solvent and drying)/(Weight of coating film before immersion in solvent)]×100 (wt %)

(3) Glass Transition Point of the Coating Layer

Differential scanning calorimetry (DSC) was carried out according to JIS K7121 for measurement of transition point of plastics to give DSC curves. The glass transition temperature Tg (°C.) was obtained from the intermediate point in the thus obtained DSC curves.

(4) Dynamic Viscoelasticity of the Coating Layer

Dynamic elastic modulus E' [Log (dyn/cm$^2$)] and loss tangent (tan δ) were measured under the following conditions with a rheograph "SOLID" (from Tokyo Semimitsu Co., Ltd.), an apparatus to measure dynamic visocelasticity.

Measuring temperature: room temperature (about 25(°C.)
Set strain: 0.5%
Static strain: 1.0%
Frequency: 5 Hz (5) Printing Durability A sample of the toner carrier was built into the developing unit, as a development roller, shown in FIG. 2. Reversal development was carried out with a non-magnetic one-component toner having an average particle diameter of 7 μm at a development bias of 400 V and a blade bias of 600 V, with the toner carrier rotating at a circumferential linear speed of 50 mm/sec. Continuous printing on 10,000 sheets was carried out at 15° C. and 10% RH (low temperature, low humidity) and at 32° C. and 85% RH (high temperature, high humidity). After printing, the toner carrier was examined. It was rated as XX in the case where it caused excessive toner filming after printing under the low-temperature/low-humidity condition and the high-temperature/high-humidity condition. It was rated as X in the case where it caused excessive toner filming after printing under either the low-temperature/ low-humidity condition or the high-temperature/ high-humidity condition. It was also rated as XX in the case where the coating layer cracked after printing under the low-temperature/low-humidity condition and the high-temperature/high-humidity condition. It was rated as X in the case where the coating layer cracked after printing under either the low-temperature/low-humidity condition or the high-temperature/high-humidity condition. It was rated as ○ in the case where it remained in good conditions after printing under the low-temperature/low-humidity condition and the high-temperature/high-humidity condition.

Example 1

A polyol composition was prepared by mixing from 100 parts by weight of polyether polyol having a molecular weight of 5,000 and a hydroxyl number of 33 mgKOH/g, which is an adduct of glycerin with propylene oxide and ethylene oxide, 1.0 part by weight of 1,4-butanediol, 0.5 part by weight of nickel acetylacetonate, 0.01 part by weight of dibutyltin dilaurate, and 2.0 parts by weight of acetylene black, using a mixing machine.

After defoaming by mixing under reduced pressure, the polyol composition was incorporated with 17.5 parts by weight of urethane-modified MDI (diphenylmethanediisocyanate). The mixture was stirred for 2 minutes and then cast into a mold previously heated to 110° C. in which a nickel-plated steel shaft had been arranged. The casting was cured at 110° C. for 2 hours. Thus there was obtained a roller which is composed of a shaft and an electrically conductive elastic layer surrounding the shaft. The surface of the roller was polished so that it had a 10-point average surface roughness of 10.5 μm Rz (according to JIS).

The surface roughness was measured with a surface roughness meter "Surfcom 590A" from Tokyo Seimitsu Co., Ltd., as explained above and the surface roughness meter was also used in the following examples.

A coating solution was prepared from the following components according to the formulation shown in Table 1 (Formulations are expressed in terms of part(s) by weight in Table 1):

"Zemrack YC3372" (from Kanegafuchi Chemical Industry Co., Ltd.), alkoxylsilyl group-containing acrylic copolymer as the major component, containing 50 wt % solid.
"Zemrack BT120S" (from Kanegafuchi Chemical Industry Co., Ltd.), organotin based curing catalyst.

MEK (methyl ethyl ketone) as a solvent.

Into this coating solution was dipped the above-mentioned roller, and the dipped roller was heated at 110° C. for 4 hours. Thus there was obtained a toner carrier in roller form (pertaining to the first aspect of the present invention) which had a crosslinked and cured coating layer, as shown in FIG. 1.

The coating layer of this toner carrier had a thickness of about 10 μm and a ratio of solvent insolubles equal to or greater than 90 wt %. The characteristic test results are shown in Table 1.

Example 2

A toner carrier in roller form (pertaining to the first aspect of the present invention) was prepared in the same way as in Example 1, except that the coating solution for the coating layer was prepared from the following components according to the formulation shown in Table 1:

"Toughteck M1962" (from Asahi Chemical Industry Co., Ltd.), functional group-containing polystyrene butadiene resin as a binder resin.

"Superbeckamine L145" (from Dainippon Ink and Chemicals, Incorporated), melamine resin containing 60 wt % solids.

"P198" (from Dainippon Ink and Chemicals, Incorporated), phosphate ester as a cure accelerator.

Toluene as a solvent.

The coating layer of this toner carrier had a ratio of solvent insolubles equal to or greater than 90 wt %. The characteristic test results are shown in Table 1.

Example 3

A toner carrier in roller form (pertaining to the first aspect of the present invention) was prepared in the same way as in Example 1, except that the coating solution for the coating layer was prepared from the following components according to the formulation shown in Table 1:

"Arronmelt PES-340S30" (from Toagosei Co., Ltd.), high-molecular-weight linear saturated polyester resin as a binder resin, containing 30 wt % solids.

"Superbeckamine L145" (from Dainippon Ink and Chemicals, Incorporated), melamine resin containing 60 wt % solids.

"P198" (from Dainippon Ink and Chemicals, Incorporated), phosphate ester as a cure accelerator.

A mixture of toluene and MEK (methyl ethyl ketone), as a solvent.

The coating layer of this toner carrier had a ratio of solvent insolubles equal to or greater than 90 wt %. The characteristic test results are shown in Table 1.

Example 4

A toner carrier in roller form (pertaining to the first aspect of the present invention) was prepared in the same way as in Example 1, except that the coating solution for the coating layer was prepared from the following components according to the formulation shown in Table 1:

"Vilon PX10SS" (from Toyobo Co., Ltd.), thermoplastic high-molecular-weight polyester resin as a binder resin, containing 60 wt % solids.

"Superbeckamine L145" (from Dainippon Ink and Chemicals, Incorporated), melamine resin containing 60 wt % solids.

"P198" (from Dainippon Ink and Chemicals, Incorporated), phosphate ester as a cure accelerator.

A mixture of toluene and MEK, as a solvent.

The coating layer of this toner carrier had a ratio of solvent insolubles equal to or greater than 90 wt %. The characteristic test results are shown in Table 1.

Example 5

A toner carrier in roller form (pertaining to the first aspect of the present invention) was prepared in the same way as in Example 1, except that the coating solution for the coating layer was prepared from the following components according to the formulation shown in Table 1:

"Eryter UE3400" (from Unichika, Ltd.), thermoplastic saturated copolymer polyester resin as a binder resin.

"Superbeckamine L145" (from Dainippon Ink and Chemicals, Incorporated), melamine resin containing 60 wt % solids.

"P198" (from Dainippon Ink and Chemicals, Incorporated), phosphate ester as a cure accelerator.

A mixture of toluene and MEK, as a solvent.

The coating layer of this toner carrier had a ratio of solvent insolubles equal to or greater than 90 wt %. The characteristic test results are shown in Table 1.

Example 6

A toner carrier in roller form (pertaining to the first aspect of the present invention) was prepared in the same way as in Example 1, except that the coating solution for the coating layer was prepared from the following components according to the formulation shown in Table 1:

"Dianal LR-2582" (from Mitsubishi Rayon Co., Ltd.), thermoplastic acrylic resin, containing 60 wt % solids, as a binder resin.

"Superbeckamine L145" (from Dainippon Ink and Chemicals, Incorporated), melamine resin containing 60 wt % solids.

A mixture of toluene and ethanol, as a solvent.

The coating layer of this toner carrier had a ratio of solvent insolubles equal to or greater than 90 wt %. The characteristic test results are shown in Table 1.

Comparative Example 1

A toner carrier in roller form was prepared in the same way as in Example 3, except that the coating solution for the coating layer was prepared from the following components according to the formulation shown in Table 1:

"Arronmelt PES-360S30" (from Toagosei Co., Ltd.), high-molecular-weight linear saturated polyester resin as a binder resin, containing 30 wt % solids.

"Superbeckamine L145" (from Dainippon Ink and Chemicals, Incorporated), melamine resin containing 60 wt % solids.

The characteristic test results are shown in Table 1.

Comparative Example 2

A toner carrier in roller form was prepared in the same way as in Example 4, except that the coating solution for the coating layer was prepared from the following components according to the formulation shown in Table 1:

"Vilon 50AS" (from Toyobo Co., Ltd.), thermoplastic high-molecular-weight polyester resin as a binder resin, containing 30 wt % solids.

"Superbeckamine L145" (from Dainippon Ink and Chemicals, Incorporated), melamine resin containing 60 wt % solids.

The characteristic test results are shown in Table 1.

Comparative Example 3

A toner carrier in roller form was prepared in the same way as in Example 6, except that the coating solution for the coating layer was prepared from the following components according to the formulation shown in Table 1:

"Dianal LR-2578" (from Mitsubishi Rayon Co., Ltd.), thermoplastic acrylic resin, containing 60 wt % solids, as a binder resin.

"Superbeckamine L145" (from Dainippon Ink and Chemicals, Incorporated), melamine resin containing 60 wt % solids.

The characteristic test results are shown in Table 1.

Comparative Example 4

A toner carrier in roller form was prepared in the same way as in Example 1, except that the coating solution for the coating layer was prepared from the following components according to the formulation shown in Table 1:

"Epikote 828" bisphenol A type liquid epoxy resin and "Epikote 871" dimer acid liquid epoxy resin (both from Yuka Epoxy Kabushiki Kaisha) as a binder resin.

Hardener

"Epomate LX2S", heterocyclic diamine modified product (from Yuka Epoxy Kabushiki Kaisha)

MEK as a solvent.

The characteristic test results are shown in Table 1.

TABLE 1-1

| | Example 1 | Example 2 | Example 3 | Example 4 | Example 5 | Example 6 |
|---|---|---|---|---|---|---|
| YC3372 | 90 | | | | | |
| M1962 | | 14 | | | | |
| 340S30 | | | 93 | | | |
| 360S30 | | | | | | |
| 50AS | | | | | | |
| PX10SS | | | | 93 | | |
| UE3400 | | | | | 28 | |
| LR2582 | | | | | | 47 |
| LR2578 | | | | | | |
| 828 | | | | | | |
| 871 | | | | | | |
| L145 | | 10 | 20 | 20 | 20 | 20 |
| LX2S | | | | | | |
| P198 | | 0.4 | 0.4 | 0.4 | 0.4 | |
| BT120S | 2 | | | | | |
| MEK | 108 | | 17 | 17 | 152 | |
| Toluene | | 176 | 69 | 69 | | 106 |
| Ethanol | | | | | | 27 |
| Tg | 0 | 0 | −20 | −15 | −20 | −20 |
| E' | 8.2 | 9.0 | 8.3 | 8.0 | 8.2 | 9.6 |
| tan δ | 0.7 | 0.1 | 0.2 | 0.3 | 0.2 | 0.2 |
| Filming | ○ | ○ | ○ | ○ | ○ | ○ |
| Cracking | ○ | ○ | ○ | ○ | ○ | ○ |

Dynamic elastic modulus E': [Log(dyn/$cm^2$)]
Glass transition point Tg: [° C.]

TABLE 1-2

| | Comparative Example 1 | Comparative Example 2 | Comparative Example 3 | Comparative Example 4 |
|---|---|---|---|---|
| YC3372 | | | | |
| M1962 | | | | |
| 340S30 | | | | |
| 360S30 | 113 | | | |
| 50AS | | 93 | | |
| PX10SS | | | | |
| UE3400 | | | | |
| LR2582 | | | | |
| LR2578 | | | 57 | |
| 828 | | | | 18 |
| 871 | | | | 7 |
| L145 | 10 | 20 | 10 | |
| LX2S | | | | 15 |
| P198 | 0.4 | 0.4 | | |
| BT120S | | | | |
| MEK | 15 | 17 | | 100 |
| Toluene | 61 | 69 | 106 | |
| Ethanol | | | 27 | |
| Tg | 65 | 4 | −10 | 35 |
| E' | 10.1 | 8.4 | 9.9 | 8.9 |
| tan δ | 0.1 | 0.8 | 0.1 | 0.2 |
| Filming | ○ | × | ○ | ○ |
| Cracking | ×× | ○ | ×× | × |

Dynamic elastic modulus E': [Log(dyn/$cm^2$)]
Glass transition point Tg: [° C.]

It is noted from Table 1 that the toner carrier pertaining to the first aspect of the present invention invariably produces good images without causing toner filming and without the coating layer cracking even after prolonged use.

The toner carrier pertaining to the third aspect of the present invention is explained with reference to the following Examples 7 to 9 and Comparative Examples 5 to 8.

Examples 7 to 9

An urethane compound or a rubber compound prepared according to the formulation shown in Table 2 was cast into a mold. The molding was vulcanized under the condition shown in Table 2. Thus there was obtained a toner carrier in roller form which is composed of a metal shaft and an elastic layer surrounding the metal shaft, as shown in FIG. 1. (This toner carrier does not have the resin coating layer 4.) Test pieces were prepared from the same composition as mentioned above under the same vulcanization conditions. They were tested for tear strength according to JIS K6252 and also for Lambourn abrasion test (according to JIS K6264). The results are shown in Table 2.

Conditions of Lambourn Abrasion Test
Grind stone: #40 sandpaper
Slipping ratio: 99%
Circumferential speed of sample: 30 cm/sec
Load: 4.5 kg
Testing time: 15 sec The thus obtained toner carrier as the development roller was built into a color laser printer, "Feather 740" (made by Tektronics Co., Ltd.). Continuous printing with a polyester toner was carried out at a linear speed of 217 mm for 40 hours. After the printing run, the surface of the development roller was examined to see if abrasion had occurred on the surface at both ends of the roller. The criteria for judgment is as follows. The results are shown in Table 2.

Criteria for Judgement
○: no abrasion at all
X: apparent abrasion (which looks as though the ends of the roller were shaved)

TABLE 2

| | | | Comparative Example 5 | Comparative Example 6 | Comparative Example 7 | Comparative Example 8 | Example 7 | Example 8 | Example 9 |
|---|---|---|---|---|---|---|---|---|---|
| Formulation* | Polyol | Polyalkylene polyol | 100 | | | | | | |
| | | Polyether polyol | | 100 | 100 | | | | |
| | Diphenylmethane diisocyanate | | 13 | 18 | 11 | | | | |
| | rubber | Polybutadiene rubber | | | | 65 | 75 | 85 | 100 |
| | | Polyisoprene rubber | | | | 35 | 25 | 15 | |
| | Conducting agent | Perchloric acid based ionic Conducting agent | | 1 | | | | | |
| | | Acetylene black | 4.5 | | 4.5 | | | | |
| | | Ink carbon | | | | 15 | 15 | 15 | 15 |
| Vulcanization, temperature (° C.)/hours | | | 90/12 h | 90/12 h | 90/12 h | 150/1 h | 150/1 h | 150/1 h | 150/1 h |
| ASKER C hardness | | | 63 | 76 | 54 | 50 | 59 | 64 | 70 |
| Tear strength (kg/cm) | | | 6.05 | 2.34 | 7.34 | 8.63 | 10.59 | 12.3 | 12.55 |
| Lambourn abrasion ($10^{-2}$ $cm^3$) | | | 5.89 | 18 | 5.54 | 6.66 | 4.85 | 1.98 | 1.48 |
| Durabillity test by actual machine | | | x | x | x | x | ○ | ○ | ○ |

*Formulation in terms of parts by weight, except that the conducting agent is expressed in terms of wt %.

It is apparent from Table 2 that the development rollers in Examples 7 to 9 (pertaining to the third aspect of the present invention), in which the elastic layer is formed from an elastic material having a tear strength equal to or greater than 10 kg/cm, are superior in abrasion resistance and produce invariably good images over a long period of time.

What is claimed is:

1. A toner carrier composed of an electrically conductive shaft and an electrically conductive elastic layer formed around said shaft, said toner carrier carrying a toner in the form of thin film on its surface, coming close to or coming into contact with the image-forming body so as to supply the toner to the surface of the image-forming body, thereby forming a visible image on the surface of the image-forming body, characterized in that said electrically conductive elastic layer has a coating layer thereon which is made of a material containing a resin with a glass transition point lower than 10° C. and has a dynamic elastic modulus (E') of $10^7$–$10^{9.8}$ dyn/$cm^2$ and a loss tangent (tan δ) smaller than 0.7.

2. A toner carrier as defined in claim 1, wherein the electrically conductive elastic layer has a hardness of 40–80, as measured by "ASKER" hardness meter, type C.

3. A toner carrier as defined in claim 1, wherein the electrically conductive elastic layer is made of at least one rubbery elastomer selected from butadiene rubber, ethylene propylene rubber, and urethane rubber.

4. A toner carrier as defined in claim 1, wherein the electrically conductive elastic layer has a resistivity of $10^3$–$10^{10}$ Ω·cm and a surface roughness smaller than 15 μm Rz in terms of 10-point average roughness according to JIS.

5. A toner carrier as defined in claim 1, wherein the coating layer is formed from at least one species selected from alkyd resin, phenolic resin, melamine resin, polyester resin, acrylic resin, acryl-modified silicone resin, and styrene-butadiene resin.

6. A toner carrier as defined in claim 1, wherein the coating layer has a thickness of 1–50 μm.

7. A toner carrier as defined in claim 1, wherein the coating layer has a ratio of solvent insolubles greater than 70 wt %.

8. A toner carrier as defined in claim 1, wherein the coating layer has a resistivity of $10^7$–$10^{16}$ Ω·cm.

9. A toner carrier as defined in claim 1, wherein the electrically conductive elastic layer has a resistivity of $10^3$–$10^{12}$Ω·cm and a surface roughness smaller than 10 μm Rz in terms of 10-point average roughness according to JIS.

10. An image-forming apparatus equipped with a toner carrier which carries a toner in the form of thin film on its surface, comes close to or comes into contact with the image-forming body so as to supply the toner to the surface of the image-forming body, thereby forming a visible image on the surface of the image-forming body, wherein the toner carrier is one which is defined in claim 1.

11. A toner carrier composed of an electrically conductive shaft and an electrically conductive elastic layer formed around said shaft, said toner carrier carrying a toner in the form of thin film on its surface, coming close to or coming into contact with the image-forming body so as to supply the toner to the surface of the image-forming body, thereby forming a visible image on the surface of the image-forming body, characterized in that said electrically conductive elastic layer is made of an elastic material having a tear strength greater than 10 kg/cm (according to JIS K6252).

12. A toner carrier as defined in claim 11, which is a development roller rotating in contact with or in the vicinity of an image-forming body holding an electrostatic latent image on its surface, supplying the toner to the surface of the image-forming body, thereby making visible the electrostatic latent image on the surface of the image-forming body.

13. A toner carrier as defined in claim 11, wherein the electrically conductive elastic layer is formed from an elastomer which experiences abrasion less than 0.1 $cm^3$ when tested by the Lambourn abrasion tester according to JIS K6264.

14. A toner carrier as defined in claim 11, wherein the electrically conductive elastic layer is formed from an elastic material which is one or more elastomer in foamed or unfoamed form selected from silicone rubber, urethane rubber, polybutadiene rubber, polyisoprene rubber, natural rubber, styrene butadiene rubber, nitrile rubber, ethylene propylene rubber, acryl rubber, epychlorohydrin rubber, and chloroprene rubber.

15. A toner carrier as defined in claims 11 to 14, wherein the electrically conductive elastic layer is covered with a resin coating layer.

16. An image-forming apparatus equipped with a toner carrier which carries a toner in the form of thin film on its surface, comes close to or comes into contact with the image-forming body so as to supply the toner to the surface of the image-forming body, thereby forming a visible image on the surface of the image-forming body, wherein the toner carrier is one which is defined in claim 11.

* * * * *